(12) United States Patent
Roffet et al.

(10) Patent No.: US 8,411,939 B2
(45) Date of Patent: Apr. 2, 2013

(54) IMAGE NOISE CORRECTION

(75) Inventors: Grégory Roffet, Coublevie (FR);
Frédérique Crete, Coublevie (FR)

(73) Assignee: STMicroelectronics S.A., Montrouge (FR)

( * ) Notice: Subject to any disclaimer, the term of this patent is extended or adjusted under 35 U.S.C. 154(b) by 1131 days.

(21) Appl. No.: 12/323,878

(22) Filed: Nov. 26, 2008

(65) Prior Publication Data
US 2009/0141978 A1 Jun. 4, 2009

(30) Foreign Application Priority Data
Nov. 29, 2007 (FR) ..................................... 07 08347

(51) Int. Cl.
*G06K 9/00* (2006.01)
(52) U.S. Cl. ........ 382/162; 382/167; 382/195; 382/199; 382/260; 382/261; 348/242
(58) Field of Classification Search .................. 382/162, 382/167, 195, 299, 260, 261, 262, 263, 264, 382/275; 348/242, 699, 241
See application file for complete search history.

(56) References Cited

U.S. PATENT DOCUMENTS

| | | | | |
|---|---|---|---|---|
| 2003/0012453 A1* | 1/2003 | Kotlikov et al. | | 382/275 |
| 2007/0280539 A1* | 12/2007 | Hasegawa et al. | | 382/195 |
| 2011/0267509 A1* | 11/2011 | Hasegawa et al. | | 348/242 |

OTHER PUBLICATIONS

Preliminary Search Report dated Jul. 9, 2008 for French Application No. 07/08347.
Demin, et al., "A Weighted Averaging Method for Image Smoothing," *Proceedings of the International Conference on Pattern Recognition (ICPR)*, Oct. 27-31, 1986, pp. 981-983, vol. 8, XP008040785, Washington, DC, USA.
Wang, et al., "Gradient Inverse Weighted Smoothing Scheme and the Evaluation of Its Performance," *Computer Graphics and Image Processing*, Feb. 1, 1981, pp. 167-181, 15:2, XP002011463, New York, USA.
Tomasi, et al., "Bilateral Filtering for Gray and Color Images," $6^{th}$ *International Conference on Computer Vision (ICCV '98)*, Jan. 4-7, 1998, pp. 839-846, XP002471367, New York, USA, ISBN: 978-0-7803-5098-4.
De Hann, et al., "Single-Chip TV Noise Reduction," *International Conference on Consumer Electronics—Digest of Technical Papers*, Jun. 7-9, 1995, pp. 390-391, XP000547866, New York, USA, ISBN: 978-0-7803-2141-0.

\* cited by examiner

*Primary Examiner* — Ali Bayat
(74) *Attorney, Agent, or Firm* — Fleit Gibbons Gutman Bongini & Bianco P.L.

(57) ABSTRACT

An image noise correction method is provided. For at least one target pixel having a determined pixel value, for each pixel in a window of pixels surrounding the target pixel, a weighting factor for the pixel is estimated based on the value of the target pixel and at least one pixel value in the window. An average of pixel values for the pixels in the window is calculated, with each pixel value being weighted by the weighting factor corresponding to the pixel. A new value is assigned to the target pixel based on the average of pixel values that is calculated. Also provided is an image noise correction device.

20 Claims, 4 Drawing Sheets

|   |   |   |
|---|---|---|
| P(i-1,j-1)= 3 | P(i-1,j)= 2 | P(i-1,j+1)= 240 |
| P(i,j-1)= 2 | P(i,j)= 241 | P(i,j+1)= 240 |
| P(i+1,j-1)= 240 | P(i+1,j)= 241 | P(i+1,j+1)= 242 |

FIG.2

|   |   |   |
|---|---|---|
| d₁=238 | d₂=239 | d₃=1 |
| d₄=239 | d₅=0 | d₆=1 |
| d₇=1 | d₈=0 | d₉=1 |

FIG.3

| $D_1 \approx 3{,}92.10^{-3}$ | $D_2 \approx 3{,}91.10^{-3}$ | $D_3 \approx 0{,}483$ |
|---|---|---|
| $D_4 \approx 3{,}91.10^{-3}$ | $D_5 = 1$ | $D_6 \approx 0{,}483$ |
| $D_7 \approx 0{,}483$ | $D_8 = 1$ | $D_9 \approx 0{,}483$ |

FIG.4

| $P'(i-1,j-1)=$ 30 | $P'(i-1,j)=$ 29 | $P'(i-1,j+1)=$ 240 |
|---|---|---|
| $P'(i,j-1)=$ 29 | $P'(i,j)=$ 241 | $P'(i,j+1)=$ 240 |
| $P'(i+1,j-1)=$ 240 | $P'(i+1,j)=$ 241 | $P'(i+1,j+1)=$ 242 |

FIG.5

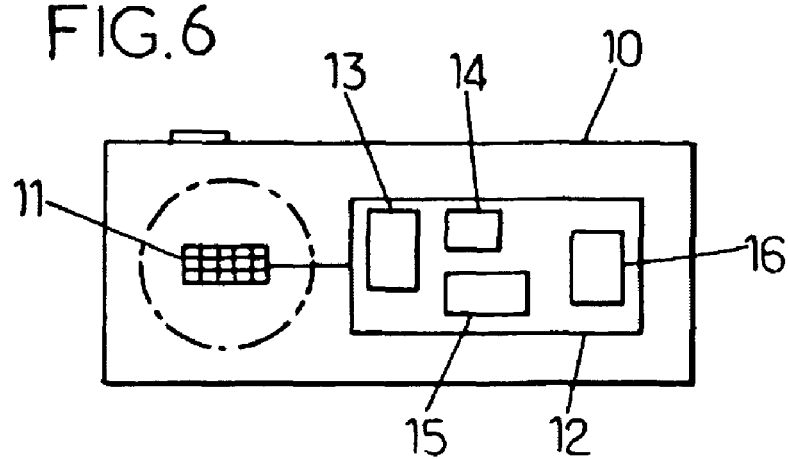
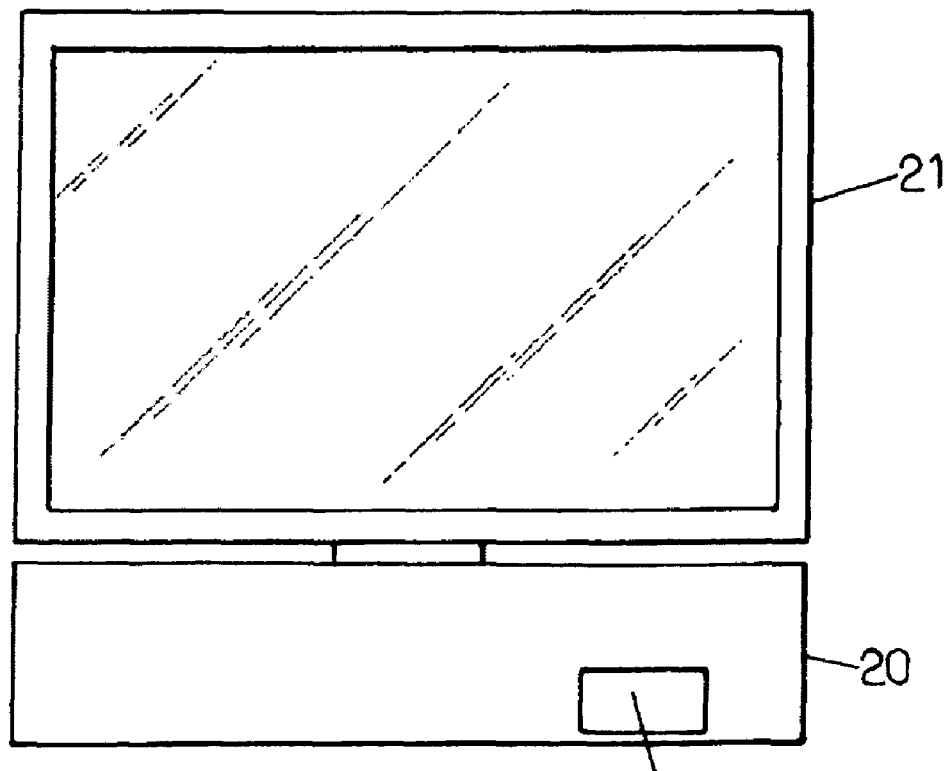

IMAGE NOISE CORRECTION

CROSS-REFERENCE TO RELATED APPLICATIONS

This application is based upon and claims priority from French Patent Application No. 07 08347, filed Nov. 29, 2007, the entire disclosure of which is herein incorporated by reference.

FIELD OF THE INVENTION

The present invention relates to image noise correction and has applications in the field of digital image processing.

BACKGROUND OF THE INVENTION

The quality of an image may be degraded by noise signals found in the digital signal encoding the image. These noise signals may originate from image sensors. For example, sensor noise may be due to insufficient lighting when the image is captured. This sensor noise appears in particular as more or less visible and more or less colored grains.

A degradation in quality may also result from digital processing applied to the information encoding the image. This is called "digital noise". For example, compression may result in a degradation of image quality. This is called "compression noise".

It is known to attempt to correct the noise that degrades an image by applying a low-pass noise reduction filter whose purpose is to attenuate the high frequencies that represent this noise. For example, a low-pass filter may be an averaging filter. With such a filter, the value of each pixel is replaced with an average of the pixels located within a window (called a "kernel") located around this pixel (called the "target pixel" or "central pixel").

To avoid degradation in detailed areas such as textured areas or contours, which are also represented by high frequencies, the low-pass filter may only be applied when there is significant noise present. In this case, the noise needs to be distinguished from the contours or textures. Conventional solutions propose classifying the image into different parts (with or without details) and applying different filters to each part.

For example, for each pixel in the window, the absolute difference is calculated between the value of this pixel and the value of the target pixel. Then an average of these differences is calculated for the pixels in the window. The low-pass filter is only applied if this average of the differences is below a threshold.

However, a window whose pixels represent a relatively uniform and noisy portion of the image could result in substantially the same averaged value for the differences as a window in which the pixels represent a better quality portion of the image containing fine details (for example, contours or texture).

The threshold is determined during a prior threshold estimation step. For example, the standard deviation between the values of the pixels in the image may be determined.

However, these thresholds may be relatively difficult to determine because they depend on the content of the image. A relatively uniform but noisy image could result in substantially the same threshold value as a better quality image with fine details.

The noise correction filter is therefore likely to be applied to regions of the image that have textures or edges but relatively little noise, with the risk of degrading the quality of these regions of the image and affecting the image resolution through the appearance of blurring. There is also the likelihood that the noise correction filter will not be applied to relatively uniform and noisy regions of the image.

SUMMARY OF THE INVENTION

It is an object of the present invention to improve the reliability of image noise correction.

One embodiment of the present invention provides an image noise correction method. For at least one target pixel having a determined pixel value, for each pixel in a window surrounding the target pixel, a weighting factor is estimated for this pixel based on the value of the target pixel and at least one pixel value in the window. An average of the pixel values for the pixels in the window is calculated, with each pixel value being weighted by the weighting factor corresponding to this pixel. A new value is assigned to the target pixel based on the average of pixel values that is calculated.

Another embodiment of the present invention provides an image noise corrective device that includes first memory, second memory, first processing means, and second processing means. The first memory stores the values of the pixels in a window of pixels surrounding a target pixel, and the first processing means estimates a weighting factor for each pixel in the window based on at least one pixel value in the window. The second processing means calculates an average of the pixel values for the pixels in the window, with each pixel value weighted by the weighting factor corresponding to that pixel. The second memory stores the new pixel value for the target pixel, with the new value being based on the average of the pixel values calculated by the second processing means.

Further embodiments of the present invention provide an electronic chip comprising such a device, a portable device comprising such an electronic chip, and a digital set-top box comprising such an electronic chip.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 2 represents a pixel window with exemplary pixel values for illustrating the method of FIG. 1.

FIG. 3 represents a pixel window with exemplary distances between pixel values for illustrating the method of FIG. 1.

FIG. 4 represents a pixel window with exemplary weighting factors for illustrating the method of FIG. 1.

FIG. 5 represents a pixel window with other exemplary pixel values for illustrating the method of FIG. 1.

FIG. 6 shows a digital photo camera according to one embodiment of the present invention.

FIG. 7 shows a digital set-top box according to one embodiment of the present invention.

DETAILED DESCRIPTION OF PREFERRED EMBODIMENTS

Figure 1:
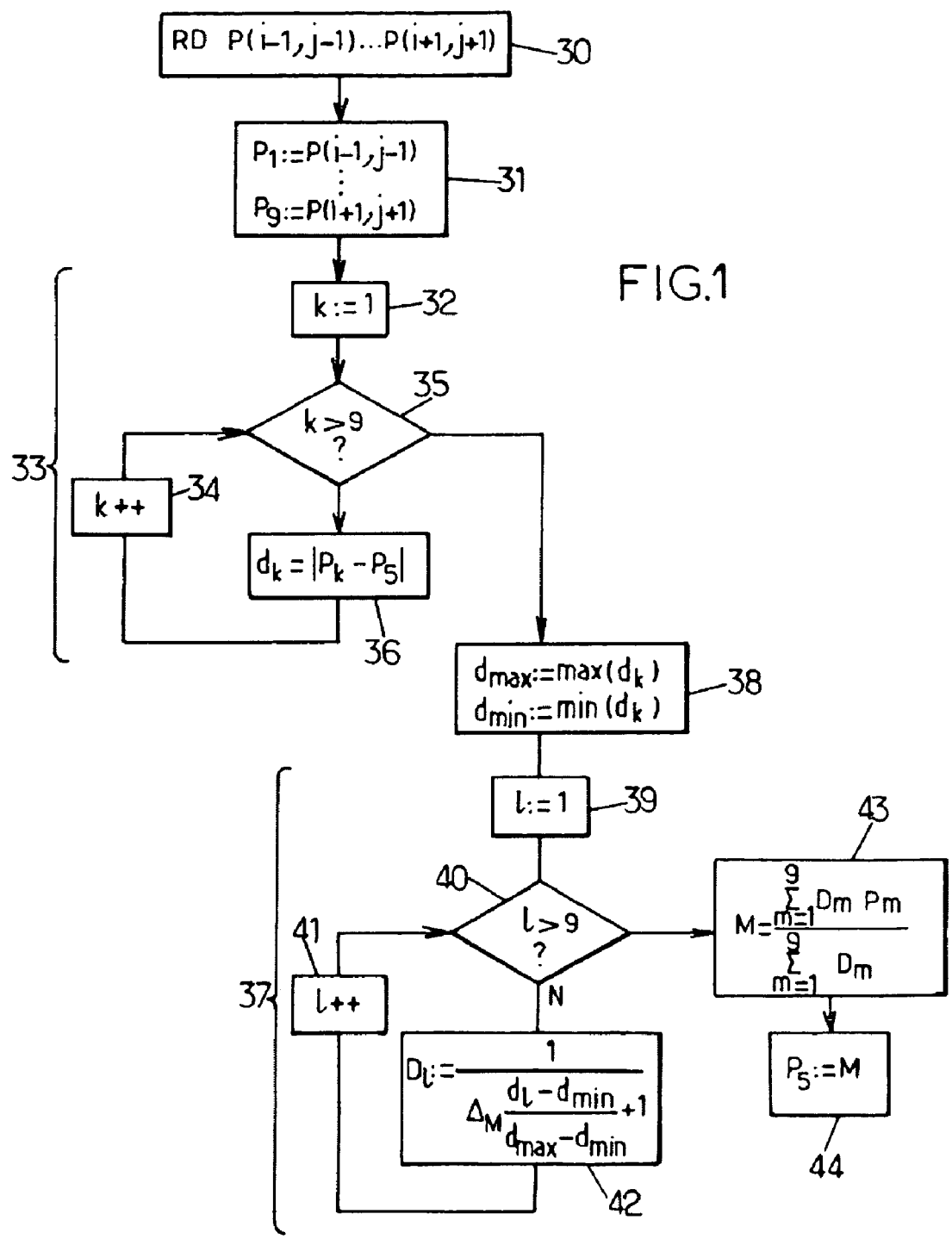
FIG. 1 is a flowchart showing a method according to one embodiment of the present invention.

Preferred embodiments of the present invention will be described in detail hereinbelow with reference to the attached drawings.

Preferred embodiments of the present invention provide an image noise correction method in which, for at least one target pixel having a determined pixel value, the following steps are performed. For each pixel in a window surrounding the target pixel, a weighting factor for this pixel is estimated based on the value of the target pixel and at least one pixel value in the window. An average of the pixel values for the pixels in the window is calculated, with each pixel value being weighted by the weighting factor corresponding to that pixel. Then, there is assigned to the target pixel a new value that is obtained based on the weighted average that was calculated.

Thus, the new value of the pixel is obtained from a weighted average of the values of the pixels in the window corresponding to this target pixel, with each weighting factor being estimated from at least one pixel value in the window. The set of weighting factors used to calculate the weighted average thus varies from one window to another, depending on the values of the pixels in the windows. Therefore, the weighted averaging filter that is applied is adaptive.

The use of such a filter, whose weighting factors vary with the values of the pixels in the window, allows more weight to be given to certain pixels in the window and less weight to be given to others based on the values of the pixels in the window.

For example, the pixels in a first area in the window, which is a uniform area containing the target pixel, may have relatively high weighting factors, while the pixels in a second area will have relatively low weighting factors. The weighted average calculated for the window in this manner will thus be relatively close to an unweighted average determined for only the pixels in the first area. This avoids the image degradation that would result from the use of a filter with predefined coefficients in detailed areas.

This relatively robust process allows there to be avoided the conventional use of thresholds for deciding whether or not to apply a noise reduction filter that has predefined weighting coefficients. It also eliminates the relative lack of reliability in estimating the threshold.

In one embodiment of the present invention, the adaptive character of the method also allows there to be avoided the application of a filter with predefined coefficients to a window with relatively little noise that contains fine details, and allows there to be avoided the non-application of this filter to a relatively uniform but noisy window.

There is also no need to store the values of pixels of an entire image in order to estimate the threshold based on a method such as the standard deviation of the image.

In addition, this method has the advantage of being relatively simple to implement; its implementation in embedded devices requires a relatively small amount of silicon area and may address numerous implementations.

This method may also be used to correct various types of noise, for example sensor noise or digital noise, in an automatic, simple, fast, and reliable manner.

In particular, this method may correct in a relatively effective manner the image degradations around edge areas ("ringing") generated by the application of an image processing algorithm such as a compression algorithm. These compression degradations occur as noise signals present in the blocks (for example, 8×8 pixels) on which the compression is based. Thus, uniform areas near edges may be degraded into blocks around the edges. The method of one embodiment of the present invention allows these degradations to be at least partially corrected.

It is advantageous if the step for estimating the weighting factor of each pixel in the window includes a determination of the distance between the value of this pixel and the value of the target pixel. This distance, for example the absolute difference between the value of this pixel and the value of the target pixel, is thus taken into account when estimating the weighting factor for the pixel. For example, for a pixel whose value is relatively different from the value of the target pixel, the weighting factor may be relatively low. Such a pixel may correspond to a detail, and in such a case too high a weight for this pixel relative to the other pixels in the window when calculating the weighted average could lead to degradation of the image.

The present invention is not limited by the type of distance used. The distance may be a Euclidian distance, a Cartesian distance, or another distance. For example, the distance may be a color distance $\Delta EH$ or $\Delta E^*_{ab94}$, for example in a Lab color space.

However, the present invention is not limited to this embodiment in which a distance is calculated for each pixel in the window. For example, in a window of 4×4 pixels or more, it may proceed such that if a first pixel in the window is separated from the central pixel by a second pixel having a value relatively different from that of the central pixel, then the weighting factor for the first pixel is estimated to be zero or a relatively low value. The first pixel is considered to be located outside a detailed area, so that it is unnecessary to use the value of the first pixel in the calculation of the weighted average.

It is advantageous if, for each pixel in the window, the corresponding weighting factor is estimated in the estimating step by inverting the calculated distance between the value of this pixel and the value of the target pixel plus a constant. Thus, a relatively low distance results in a relatively high weighting factor, while a relatively high distance results in a relatively low weighting factor.

The addition of a constant allows infinite weighting factors to be avoided when the distance is zero.

The weighting factor for each pixel is thus estimated in a relatively simple manner, based on the values of this pixel and the target pixel. However, the present invention is not limited to an inversion. Other decreasing functions may be applied, for example the inverse of the exponential of the distance so calculated, the inverse of a constant increased by a logarithm of the distance increased by a constant, a function obtained by derivation or integration, or another function.

It is advantageous if, for each pixel in the window, the distance between the value of this pixel and the value of the target pixel is normalized by taking into account the minimum and maximum distances, for the pixels in the window, between the values of the pixels in the window and the value of the target pixel or central pixel. In this manner, the distances are relative to a minimum distance and a maximum distance in the window. The set of weighting factors obtained for a given window thus varies relatively little if certain parameters increase in this window, such as the contrast or the luminosity.

For example, if the pixels of a window are divided into two areas, with the pixels in the first area having values near a first value and the pixels in the second area having values near a second value, it is of little importance whether or not the second value is far from the first value when estimating the weighting factors. The filter applied in this manner is substantially the same.

In the embodiment in which the weighting factor is obtained by inverting the distance after adding a constant, it may be possible to have the constant be normalized by the maximum distance in the window.

However, the present invention is not limited by this optimization in which the distance values are normalized. It may proceed such that the more the second value differs from the first value, the less the pixels in the second area are taken into account in the calculation of the weighted average.

The pixel window may or may not include the target pixel. For example, a window of 3×3 pixels may only include the eight pixels located around the target pixel. In this case, the new value assigned to the target pixel may be, for example, the weighted average of the values of these eight pixels, or this weighted average plus the initial value of the target pixel. If the new value of the target pixel is the weighted average of the values of the eight pixels surrounding the target pixel only, it is relatively easy to eliminate isolated defects. If, for example, the target pixel is located in a relatively uniform and light area, but has a value corresponding to a dark color, this value is replaced with a weighted average of the pixels in the light area only. The isolated defect constituted by this pixel is thus corrected.

The present invention is not limited by the nature of the pixel values. In the case of a gray level image, the value of a pixel may indicate the luminance of the pixel.

The pixel values may be the component values of an RGB color space ("Red Green Blue"), sRGB ("standard RGB"), XYZ, Lab, or other color space.

It is advantageous if the pixel values are the component values of a YUV or YCrCb color space. The image details are thus primarily defined by the Y luminance component, with the U and V chrominance components more defining the image colors.

For each image, the method of an embodiment of the present invention may be applied to these three components. This process does not require estimating a threshold for each of these three components, in spite of the risk of the Y component values varying more than the U and V component values, and the same algorithm may be applied to each Y, U, and V component without a prior adjustment step.

Another embodiment of the present invention provides an image noise corrective device that includes a first memory for storing the values of the pixels in a window of pixels surrounding a target pixel, first processing means for estimating a weighting factor for each pixel in the window based on at least one pixel value in the window, second processing means for calculating an average of the pixel values for the pixels in the window, with each pixel value weighted by the weighting factor corresponding to that pixel, and a second memory for storing the new pixel value for the target pixel, with the new value being obtained based on the weighted average calculated by the second processing means.

The first and second memories may be integrated into one memory or may constitute two separate memories. The first and second processing means may be integrated into one device or may be separate.

A further embodiment of the present invention provides an electronic chip comprising such an image noise corrective device. The chip may be programmable, such as an FPGA ("Field-Programmable Gate Array"). The chip may be reprogrammable, such as a DSP ("Digital Signal Processor") or EPLD ("Electrically Erasable Programmable Logic Device"). The method of one embodiment of the present invention may also be silicon-based, such that the chip is designed to implement this method, possibly with other processes. The present invention is therefore not limited by the nature of the chip.

Yet another embodiment of the present invention provides a portable device comprising such an electronic chip (for example, a digital photo camera, digital video camera, personal digital assistant (PDA), pocket camera, or other device). The chip thus allows correcting the sensor noise and/or the digital noise related to the image processing performed by an image processing device within the portable device (for example, an image compression device).

The chip may also be integrated with a Webcam-type of device.

Still another embodiment of the present invention provides a digital set-top box comprising such an electronic chip. The chip allows correcting, among other things, any degradation in edge areas ("deringing") due to noise from compression.

Although the present invention, due to its simplicity and its speed of execution, has applications which are particularly advantageous in embedded devices, the present invention is not limited to these applications. A device according to an embodiment of the present invention may thus be part of a computer or a server, such as for correcting noise in images distributed on the Internet.

Another embodiment of the present invention provides a computer program stored in the memory of a processing unit or terminal, and/or on a tangible computer-readable medium able to cooperate with a drive of the processing unit, and/or downloadable via a telecommunications network, with the program comprising instructions for implementing a process according to an embodiment of the present invention.

Exemplary embodiments of the present invention will now be described in detail with reference to FIGS. 1-7. Identical references in different figures may be used to represent identical or similar objects. FIGS. 2 to 4 are used to illustrate the flowchart in FIG. 1, so FIGS. 1 to 4 will be discussed together.

FIG. 1 is a flowchart showing a method according to one embodiment of the present invention. By way of example, this flowchart is for correcting the value of a pixel located in the $i^{th}$ row and $j^{th}$ column of an image, called the "target pixel". A window of 3×3 pixels (labeled 1 in FIGS. 2 to 4) is defined around this target pixel (labeled 2 in FIGS. 2 to 4). The window 1 so defined is represented by dotted lines in FIGS. 2 to 4. In FIG. 2, the values $P(i-1, j-1), \ldots, P(i+1, j+1)$ are given for the pixels in the window 1. In this example, these values vary between 0 and 255, but in further embodiments they may vary differently (for example, between −127 and +128, between 1 and 16, or between other values).

The represented window 1 contains a light area (pixels $P(i-1, j-1)$, $P(i-1, j)$ and $P(i, j-1)$) and a relatively dark area (the other pixels). The values of the pixels inside this window are read (step 30) and stored (step 31).

For each pixel in the window 1, a distance is calculated, for example the absolute difference between the value of this pixel and the value of the target pixel (step 36). A loop 33 containing the conventional steps of initialization 32, test 35, and incrementation 34 is implemented in order to scan the pixels in the window, with the variable k indicating the pixel for which the difference $d_k$ is being calculated. In this embodiment, "difference" is understood to mean the "absolute difference", as is represented in FIG. 1. In further embodiments, any other distance calculation may be applied.

FIG. 3 shows the values of the differences $d_k$ for the window 1. For the pixels corresponding to the light area the differences are relatively high, because the target pixel belongs to the relatively dark area.

The minimum $d_{MIN}$ and maximum $d_{MAX}$ differences are determined (step 38). The maximum difference $d_{MAX}$ is equal to the greatest of the differences $d_1, \ldots, d_9$, which in this example is a difference of 239.

The minimum difference $d_{MIN}$ is equal to the smallest of the differences $d_1, \ldots, d_9$, which in this example is a difference of 0. Because the pixel stored in step 31 as the $5^{th}$ pixel is the target pixel, the difference $d_5$ must necessarily be zero.

Thus, there may be found the minimum difference among $d_1, \ldots, d_4, d_6, \ldots, d_9$, in order to avoid always obtaining a zero minimum difference.

Next comes a new loop 37 containing the conventional steps of initialization 39, test 40, and incrementation 41. For each indexed pixel 1, a corresponding weighting factor $D_l$ is estimated (step 42), by applying the following formula.

$$D_l = \frac{1}{\Delta_M \dfrac{d_l - d_{MIN}}{d_{MAX} - d_{MIN}} + 1} \quad (1)$$

where $\Delta_M$ is the difference between the lowest pixel value threshold (0 here) and the highest threshold (255 here). In this example, the value of $\Delta_M$ is therefore 255.

The value $$d_l^{norm} = \Delta_M \frac{d_l - d_{MIN}}{d_{MAX} - d_{MIN}}$$

constitutes a normalized value for the difference $d_l$, taking into account the minimum $d_{MIN}$ and maximum $d_{MAX}$ differences in the window. For the pixel having the greatest difference $d_l$, the normalized value $d_l^{norm}$ is $\Delta_M$. For the pixel having the smallest difference $d_l$, the normalized value $d_l^{norm}$ is zero.

The following is an example.

$$d_1^{norm} = \Delta_M \frac{d_1 - d_{MIN}}{d_{MAX} - d_{MIN}} = 255 \frac{238 - 0}{239 - 0} \approx 253.93$$

To this normalized value a constant is added, for example 1, to avoid having a zero denominator in formula (1) when $d_l$ is zero.

FIG. 4 shows the values close to $D_l$ in the window 1, using the pixel values in FIG. 2. For the pixels corresponding to the light area, the weighting factors are particularly low, on the order of $10^{-3}$, while for the pixels corresponding to the dark area in which the target pixel is located, the weighting factors assume higher values on the order of 1 or 0.5.

In step 43, an average M of the values of the pixels in the window 1 is calculated, with this average M being weighted by the estimated weighting factors.

Using the pixel values in FIG. 2, this weighted average M would be equal to about 240.04.

Then, in step 44, the value of this weighted average M is assigned to the target pixel as a new pixel value. This value, close to 240 and therefore indicative of a dark area, is relatively little affected by the fact that the target pixel is located at the edge between the dark area and the light area.

In particular, this process may be used to correct compression noise ("deringing"). Compression algorithms implement blocks of pixels, for example blocks of 8×8 pixels or 16×16 pixels. Compression noise occurs as noise signals that are sufficiently high for this block structure to appear in the image. Thus, uniform areas that border edges may be degraded into blocks near the edges. The process of this embodiment of the present invention calculates a weighted average in a manner that considerably decreases the weight of pixels belonging to an area other than the area of the pixel to be corrected. This process may therefore be relatively effective for correcting compression noise.

The steps in the process of FIG. 1 assign a new value to a single pixel, located in the $i^{th}$ row and $j^{th}$ column of an image. In order to cover all pixels in the image, loops may be implemented, for example using the conventional steps of initialization, test, and incrementation.

Further, the steps of FIG. 1 may be performed once per component (for example, three times if the pixel values are YUV or RGB component values).

FIG. 5 shows another example of a pixel window. In this example the values are identical to the pixel values in FIG. 2, except for the pixels in the light area, which this time have relatively higher levels of around 30.

For these pixels, the differences $d_1$, $d_2$ and $d_4$ are respectively 211, 212 and 212. The maximum difference $d_{MAX}$ this time is therefore equal to 212.

This leads to the following.

$$d_1^{norm} = \Delta_M \frac{d_1 - d_{MIN}}{d_{MAX} - d_{MIN}} = 255 \frac{211 - 0}{212 - 0} \approx 253.80$$

This value is relatively close to the normalized value obtained for this pixel when its value P1 is 3, as shown in FIG. 2. The resulting weighting factors will therefore also be relatively close.

Normalization allows there to be given substantially the same weight to pixels in the light area when calculating the weighted average M, whether these pixels have values that are close to 3 or close to 30.

The window is 3×3 pixels in the illustrated examples, but it may be of another size in further embodiments. For example, windows of 5×5 pixels or 7×7 pixels may be used.

FIG. 6 shows a digital photo camera according to an embodiment of the present invention. This camera 10 includes image sensors 11, for example CCD ("Charge-Coupled Device") or CMOS ("Complementary Metal-Oxide Semiconductor") sensors. These sensors are connected to an electronic chip 12, for example a processor, that includes a memory 13 for storing the pixel values of images captured by the sensors. A processing means 15, for example a CPU ("Central Processing Unit") and program memory, are dedicated to image noise correction. This processing means 15 corrects each pixel in the image, one after another. For each pixel not located at an image side or top/bottom, a 3×3 window is defined, and the values of the pixels in this window are stored in a memory 14. Alternatively, the processing means directly processes these pixel values using the values stored in the memory 13.

From these values, the processing means 15 estimates a weighting factor for each pixel in the window, and then calculates an average of the values of the pixels in the window weighted by these weighting factors. A new pixel value for the pixel in question is obtained from this weighted average, and is stored in memory 16.

FIG. 7 shows a digital set-top box according to an embodiment of the present invention. The set-top box 20 is connected to a television set 21. This box 20 receives sequences of images degraded by compression processing or other sources of degradation. The box 20 integrates an electronic chip 22 for correcting compression noise. The chip 22 is configured, for example, to execute the process of FIG. 1.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for image noise correction, the method comprising, for at least one target pixel having a defined pixel value:
    for each pixel in a window of pixels surrounding the target pixel, estimating a weighting factor for that pixel, the weighting factor being based on the value of the target pixel and the value of at least one pixel within the window;
    calculating an average of pixel values for the pixels in the window, the calculating of the average of pixel values comprising weighting the value of each pixel within the window by the weighting factor that was estimated for that pixel; and
    assigning to the target pixel a new value that is based on the average of pixel values that was calculated,
    wherein the estimating of the weighting factor for each pixel in the window comprises determining a difference between the value of that pixel and the value of the target pixel.

2. The method according to claim 1, wherein the pixel values are the component values of a YUV color space.

3. The method according to claim 1, wherein the window of pixels has a size of at least 3×3 pixels.

4. The method according to claim 1, wherein the estimating of the weighting factor for each pixel in the window comprises, for each pixel in the window, at least one of:
    inverting the difference between the value of that pixel and the value of the target pixel to which a constant has been added, and
    normalizing the difference between the value of that pixel and the value of the target pixel by taking into account a minimum distance and a maximum distance between the values of the pixels in the window and the value of the target pixel.

5. The method according to claim 1, wherein the difference that is determined is an absolute difference between the value of that pixel and the value of the target pixel.

6. A method for image noise correction, the method comprising, for at least one target pixel having a defined pixel value:
    for each pixel in a window of pixels surrounding the target pixel, estimating a weighting factor for that pixel based on the value of the target pixel and at least one pixel value within the window;
    calculating an average of pixel values for the pixels in the window, each pixel value being weighted by the weighting factor corresponding to the pixel; and
    assigning to the target pixel a new value that is based on the average of pixel values that is calculated,
    wherein the estimating of the weighting factor for each pixel in the window comprises, for each pixel in the window, estimating the corresponding weighting factor by inverting a distance between the value of that pixel and the value of the target pixel to which a constant has been added.

7. A method for image noise correction, the method comprising, for at least one target pixel having a defined pixel value:
    for each pixel in a window of pixels surrounding the target pixel, estimating a weighting factor for that pixel based on the value of the target pixel and at least one pixel value within the window;
    calculating an average of pixel values for the pixels in the window, each pixel value being weighted by the weighting factor corresponding to the pixel; and
    assigning to the target pixel a new value that is based on the average of pixel values that is calculated,
    wherein the estimating of the weighting factor for each pixel in the window comprises, for each pixel in the window, normalizing a distance between the value of that pixel and the value of the target pixel by taking into account a minimum distance and a maximum distance between the values of the pixels in the window and the value of the target pixel.

8. An image noise correction device comprising
    first memory for storing pixel values of pixels in a window around a target pixel;
    first processing means for estimating a weighting factor for each pixel in the window based on the pixel value of the target pixel and at least one pixel value in the window;
    second processing means for calculating an average of pixel values for the pixels in the window, each pixel value being weighted by the weighting factor corresponding to the pixel; and
    second memory for storing a new pixel value for the target pixel, the new value being based on the average of pixel values that is calculated by the second processing means.

9. The image noise correction device according to claim 8, wherein the first processing means, in estimating the weighting factor for each pixel in the window, determines the distance between the value of that pixel and the value of the target pixel.

10. The image noise correction device according to claim 9, wherein the first processing means, in estimating the weighting factor for each pixel in the window, estimates, for each pixel in the window, the corresponding weighting factor by inverting the distance between the value of that pixel and the value of the target pixel to which a constant has been added.

11. The image noise correction device according to claim 9, wherein the first processing means, in estimating the weighting factor for each pixel in the window, normalizes, for each pixel in the window, the distance between the value of that pixel and the value of the target pixel by taking into account a minimum distance and a maximum distance between the values of the pixels in the window and the value of the target pixel.

12. The image noise correction device according to claim 8, wherein the pixel values are the component values of a YUV color space.

13. An electronic chip comprising an image noise correction device according to claim 8.

14. A digital set-top box comprising an electronic chip according to claim 13.

15. A portable device comprising an electronic chip according to claim 13.

16. A non-transitory computer-readable medium encoded with a computer program for image noise correction, the computer program comprising instructions for, for at least one target pixel having a defined pixel value:

for each pixel in a window of pixels surrounding the target pixel, estimating a weighting factor for that pixel, the weighting factor being based on the value of the target pixel and the value of at least one pixel within the window;

calculating an average of pixel values for the pixels in the window, the calculating of the average of pixel values comprising weighting the value of each pixel within the window by the weighting factor that was estimated for that pixel; and assigning to the target pixel a new value that is based on the average of pixel values that was calculated, wherein the estimating of the weighting factor for each pixel in the window comprises determining a difference between the value of that pixel and the value of the target pixel.

17. The non-transitory computer-readable medium according to claim 16, wherein the estimating of the weighting factor for each pixel in the window comprises, for each pixel in the window, estimating the corresponding weighting factor by inverting the difference between the value of that pixel and the value of the target pixel to which a constant has been added.

18. The non-transitory computer-readable medium according to claim 16, wherein the estimating of the weighting factor for each pixel in the window comprises, for each pixel in the window, normalizing the difference between the value of that pixel and the value of the target pixel by taking into account a minimum distance and a maximum distance between the values of the pixels in the window and the value of the target pixel.

19. The non-transitory computer-readable medium according to claim 16, wherein the pixel values are the component values of a YUV color space.

20. An image noise correction device comprising:

first memory storing pixel values of pixels in a window around a target pixel;

at least one processor programmed to:
estimate a weighting factor for each pixel in the window based on the pixel value of the target pixel and at least one pixel value in the window; and
calculate an average of pixel values for the pixels in the window, each pixel value being weighted by the weighting factor corresponding to the pixel; and second memory storing a new pixel value for the target pixel, the new value being based on the average of pixel values that is calculated by the at least one processor.

* * * * *